United States Patent [19]

Lagares Corominas

[11] Patent Number: 5,716,265
[45] Date of Patent: Feb. 10, 1998

[54] AUTOMATIC STRIPPING MACHINE FOR MEAT PRODUCTS WITH INTEGRATED FILLED MOLD FEEDING

[75] Inventor: Narcís Lagares Corominas, Girona, Spain

[73] Assignee: Metalquimia, S.A., Girona, Spain

[21] Appl. No.: 649,531

[22] Filed: May 17, 1996

[30] Foreign Application Priority Data

May 17, 1995 [ES] Spain .................................. 9500942

[51] Int. Cl.$^6$ ........................................................ A22C 7/00
[52] U.S. Cl. ............................ 452/174; 452/125; 426/513
[58] Field of Search ................................. 452/174, 125; 426/512, 513

[56] References Cited

U.S. PATENT DOCUMENTS 5,569,070  10/1996  Smith ..................................... 452/174

FOREIGN PATENT DOCUMENTS

| 0138653 | 4/1985 | European Pat. Off. . | |
|---|---|---|---|
| 0317519 | 5/1989 | European Pat. Off. . | |
| 0570323 | 11/1993 | European Pat. Off. . | |
| 570323 | 11/1993 | European Pat. Off. | 452/174 |
| 2549000 | 1/1981 | France . | |
| 2483183 | 12/1981 | France . | |
| 2505297 | 11/1982 | France | 452/174 |
| 3729478 | 3/1988 | Germany | 452/174 |
| 2261625 | 5/1993 | United Kingdom | 452/174 |

*Primary Examiner*—Willis Little
*Attorney, Agent, or Firm*—Jacobson, Price, Holman & Stern, PLLC

[57] ABSTRACT

An automatic stripping machine for meat products such as hams or other meat products which have been previously baked in a mold and compressed by a lid inserted in the mold and provided with at least a crosspiece mounted in a floating arrangement on two or more columns integral with the lid, with interposition of a resilient device and arms having a toothed profile for locking the lid to the mold, being hinged on one end of the crosspiece and having one of their teeth locked under an external rim which surrounds the mold opening. The machine carries out in a sequential and automatic way the operations of sequential feeding of the molds filled with the meat product and closed with a lid; identifying the number of lid locking arms for the purpose of subsequently removing the lid; removing the lid from the mold; stripping the product from the mold; and separately discharging the product and the empty mold.

17 Claims, 11 Drawing Sheets

AUTOMATIC STRIPPING MACHINE FOR MEAT PRODUCTS WITH INTEGRATED FILLED MOLD FEEDING

FIELD OF THE INVENTION

The present invention concerns an automatic stripping machine for meat products such as hams or other meat products which have been previously baked in a mold and compressed by a lid inserted in said mold and provided with at least a crosspiece mounted in a floating arrangement on two or more columns integral with said lid, with interposition of resilient means and arms having a toothed profile for locking said lid to the mold, being hinged on one end of said crosspiece and having one of their teeth locked under an external rim which surrounds the mold opening. The machine carries out in a sequential and automatic way the operations of: sequential feeding of the molds filled with the meat product and closed with a lid; identifying the number of lid locking arms for the purpose of subsequently removing said lid; removing the lid from the mold; stripping the product from said mold; and separately discharging said product and the empty mold.

PRIOR ART

Patent EP-A-0138653 discloses a machine of the above type which is characterized in that it automatically performs all necessary operations, starting from the closed mold up to the discharge of the product and the empty molds. It has nevertheless to be pointed out that in this machine the means used to release the arms locking the lid to the mold, as well as those used to hold the mold and to lead it during its conveying along the machine, since this comprises a U-shaped trough having in its longitudinal extension a detachable arched length, cause this machine not to be very versatile for the handling of different types of molds.

Patent EP-A-0317519 discloses another machine for the described purpose which provides a linear circuit with means provided for removing the lid from the mold and means for inverting the position of the mold, stripping the product and discharging said product and the empty mold, and which, though showing an advance with respect to the mentioned prior art, implies the use of likewise very specific means for a given type of mold concerning both the removal of the lid and the discharge of the mold, the machine being therefore again not very versatile for the handling of different types of molds, thus requiring for its adaptation quite complex and costly operations.

Patents FR-A-2459000 and FR-A-2483183 disclose a machine comprising a support for lodging and fastening at least one mold, said support being rotatable around a horizontal axis between a position in which said mold is oriented face up and is dispossessed of its lid by a removing device, and a second position in which the mold is arranged face down and is emptied, said support including inserts for the adaptation to one or another of the several mold types to be handled. This machine presents the shortcoming of having a reduced working capacity since it has a slow and discontinuous working cycle, and it has as well very little flexibility to adapt itself to different mold types, the lid removal systems being complex and not very adaptable to different molds, in particular hardly usable to handle molds shaped like round barrels and closed by four locking arms. This machine presents the additional drawback that each lid is placed again on the corresponding emptied pot before the discharge of the latter, which requires an additional subsequent operation for removing the lid from the mold.

Patent EP-A-0570323, issued to the applicant, concerns in its turn an automatic stripping machine for meat products comprising four supports provided to lodge and fasten different molds, mounted on a rotary supporting structure provided to index said molds in a closed circuit, each support comprising a frame for mounting interchangeable plates each of them comprising an opening allowing to insert (to hand-load) the body of a given mold, an outer rim surrounding the opening of said mold coming to rest on the periphery of said plate opening, each of said plates including means to temporarily fasten the mold body to the plate and to simultaneously hold the locking arms which fasten the lid to the mold, said frames successively passing during their indexing in a closed circuit: a first station for loading onto the plates fastened to the frames a mold filled with the just baked product, a second station having a lid removing and discharging device, a third station with means to strip the product from the mold and to discharge it to the outside, and a fourth station where the empty mold is discharged. This machine has the drawback that it has to be loaded manually and is hardly modularizable and very bulky, allowing to handle at the same time only a limited number of molds and requiring for a bigger number the replacement of said plates fastened to the frames.

The invention has as its main object the construction of a machine for automatically carrying out the operations for the stripping of meat products in a continuous cycle, including the continuous feeding of the molds (for example by means of a conveyor belt) avoiding the previously cited drawbacks, with a high productivity, and comprising means which allow to handle at the same time and without interrupting the operational cycle molds of different types fed in a sequential way to the machine, the latter being because of its conception highly versatile, i.e. adaptable to different kinds of molds in a very simple way. The proposed machine is besides of modular conception, allowing the construction of assemblies for higher production cycles, including two or more basic operational units and comprising single lines for the discharge of the product, the lids and the molds.

BRIEF DESCRIPTION OF THE INVENTION

For such a purpose, the invention is characterized in that it consists of an assembly integrating at least one conveyor belt for the feeding of the molds, properly centered, up to the vicinity of a polygonal body which is in particular a quadrangular one and is rotatable around a horizontal central axis which is arranged transversally to the mold feeding direction, each of the outer flat faces of said body integrating means to temporarily hold the body of a mold by fastening it with its bottom resting on the corresponding face, with the possibility of an adaptation to the characteristics of the molds to be handled, said body being able to orient itself by successive rotational increments of uniform amplitude (90 degrees):

- to face a loading station which transfers the molds filled with the meat product from the end of said conveyor belt onto the closest face of said polygonal body;
- to face a station provided to release the locking arms fastening the lid to the mold, thereupon removing the lid from said mold, and finally unloading said lid onto a discharging conveyor belt;
- to face a member provided to assist in the removal of the product which is unloaded by gravity onto a first transversal discharging belt extending below said polygonal body in a direction parallel to its turning axis; and to hover above a second belt for the discharge of the empty molds which is parallel to said first belt and coplanar with it, said mold fastening means being on this instant actuated to thus release the mold which thereupon falls by gravity onto said second discharge belt.

The mold feeding belt integrates means for a perfect centering of said molds both in the longitudinal and transversal directions the instant they have reached an end position next to the loading station, in order to facilitate the mold type detection (number of locking arms) by means of feeler devices associated to proximity detectors associated to a gripper device of said station, and a secure grip of said molds. Said feeding belt integrates cross members provided to contribute to an efficient conveying of the molds which are generally hand-loaded onto its surface by an operator.

If a mold is not suitably detected due to a positioning fault, means have been provided to laterally discharge said mold in order to reload or assess it.

Each of said stations for the loading of the molds from the end of the belt feeding the molds filled with mean product and for the removal of the lid from the molds integrates a gripper governed by an opening and closing structure to grip the crosspiece associated to the lid of the mold, said gripper being besides attached to the rod of a fluid-operated cylinder with a rectilinear travel allowing to approach it to the mold till the gripper reaches the crosspiece of the corresponding mold, respectively situated on the end of the feeding unit (first gripper of the loading station) or on the face of the rotating body (second gripper of the lid removing station). Said gripper of the loading station has besides associated feelers associated to resiliently loaded rods mounted in a sliding arrangement and whose ends are in the vicinity of proximity detectors for the detection of the characteristics of the molds, which supply an information for a proper positioning of the second gripper for the removal of the lid by shifting the lid locking arms. Both said grippers are tiltable, and for such a purpose they are rotatably suspended from an intermediary point of the barrel of said approaching cylinders, and have their upper end linked to a transversally actuating, fluid-operated cylinder in such a way that they can pivot 45 degrees till their central part where the gripper is located is situated at right angles to one of the faces of said polygonal body, said face having been as well turned and thus brought to a position where it faces said gripper.

Said polygonal body is rotationally actuated by an intermittent drive unit connected to the end of a shaft arranged centrally to the polygonal body.

Other characteristics as well as the advantages of the present invention will become apparent when reading the following detailed description of a non limiting example of an embodiment shown in the enclosed drawings.

DETAILED DESCRIPTION OF A PREFERRED EMBODIMENT

As illustrated in said drawings, and as it has previously indicated, the proposed machine has been conceived for the stripping of meat products, such as hams or other meat products or meat block 1 which have been previously baked in a mold 2 and compressed by a lid 3 inserted in said mold and provided with at least a crosspiece 4 mounted in a floating arrangement on two or more columns integral with said lid, with interposition of resilient means and arms 5 having a toothed profile for locking said lid 3 to the mold 2, being resiliently hinged on different points of said crosspiece and having one of their teeth locked under an external rim 2a which surrounds the mold opening, said machine successively carrying out under the control of automatical operation of: sequential feeding of the molds filled with the meat product and closed with a lid; identifying the number of lid locking arms for the purpose of subsequently removing said lid; removing the lid from the mold and discharging said lid; stripping the product from said mold; and separately discharging said product and the empty molds.

The concerned machine comprises:
- a conveyor 6 for feeding the molds 2 filled with the meat product 1;
- at least a polygonal body 9 rotating around a horizontal central axis which is arranged transversally to the mold feeding direction, the outer faces 9a–9d of said body integrating means to temporarily fasten a mold 2 with its base resting on said face 9a–9d, said polygonal body being rotationally actuated by an intermittent drive unit 10 provided to position each of the faces 9a–9d of said polygonal body 9 in successive steps covering rotational increments of uniform amplitude: in proximity of a first station 11 for transferring the molds filled with the meat product onto said face; facing a second station 12 for the removal and discharge of the lid of the mold through a path 13; in proximity of a third station 14 having means to aid the removal of the product 1 from the mold 2 and above a conveyor belt 15 for the discharge of the stripped product; and finally above a conveyor belt 16 for the discharge of the empty molds, respectively.

In the embodiment illustrated said polygonal body 9 is a straight prismatic, quadrangular one and is rotatably supported on two of its opposed sides and connected on one of them to an intermittent rotational drive unit 10. The body 9 houses inside means 17, 18, which will be following explained in a full detail, for temporarily fastening the molds 2, as well as blowing means 20, 21, 23 to aid the stripping step.

Figure 1:
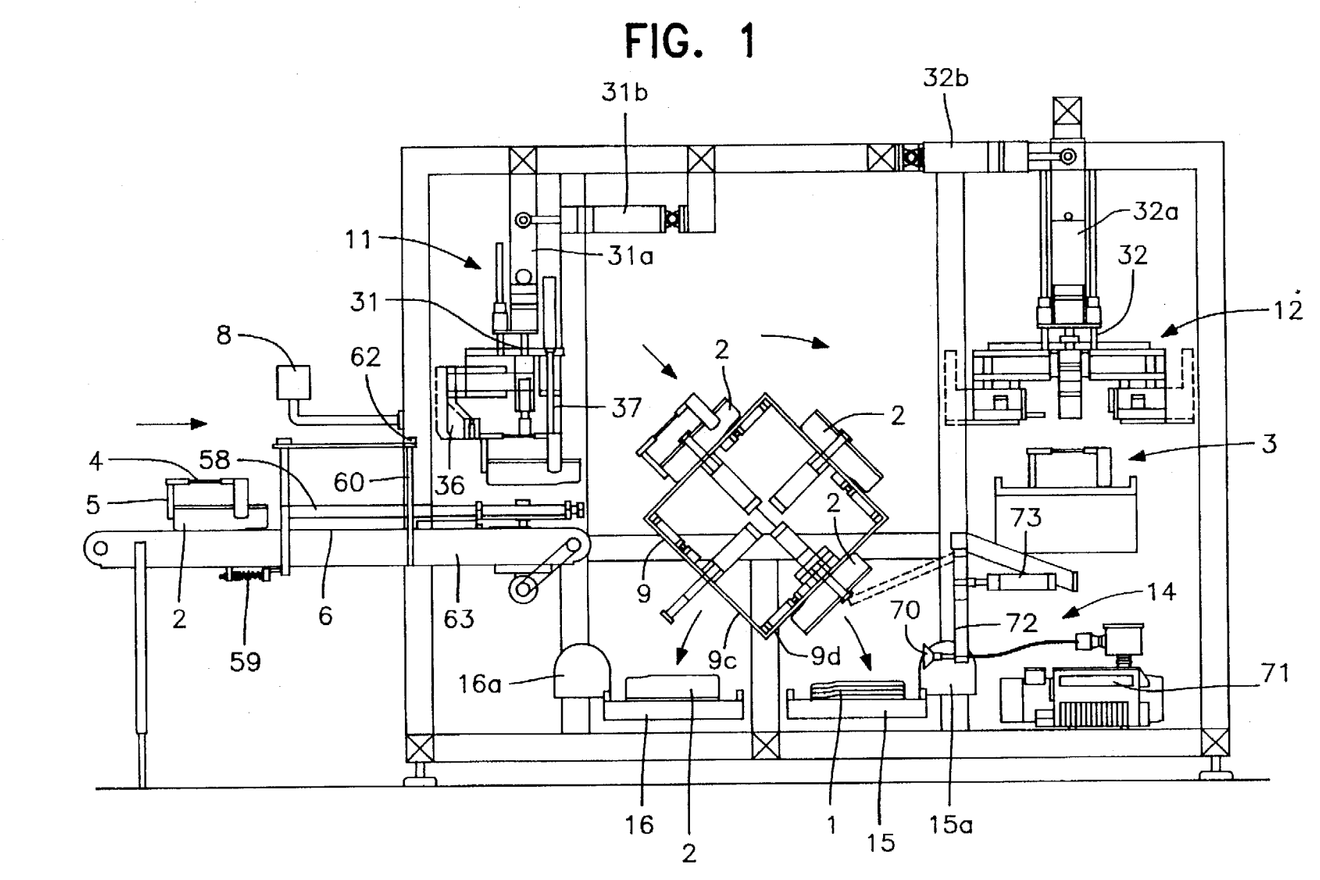
FIG. 1 is a side elevation of the machine showing all its basic elements.
Figure 2:
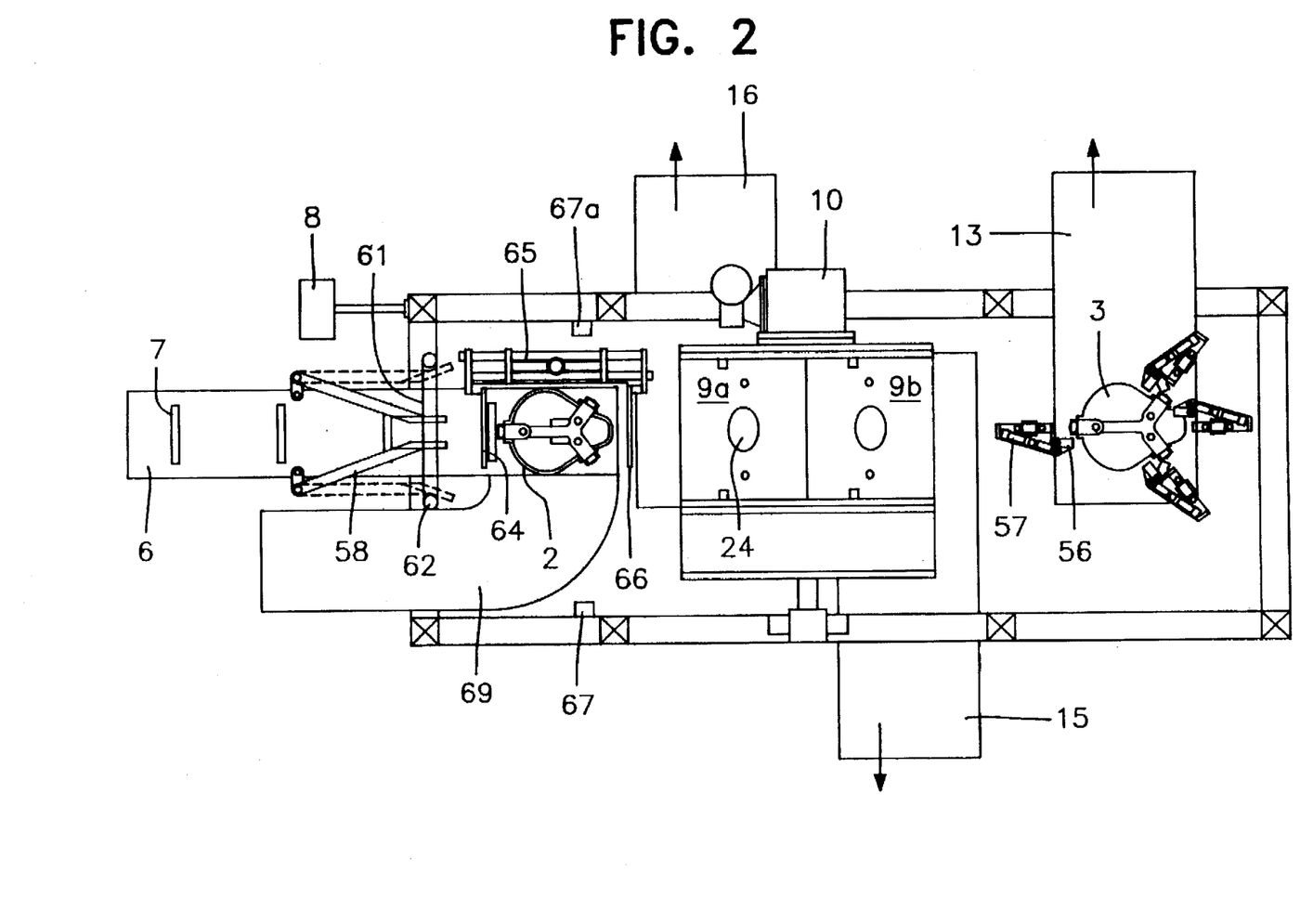
FIG. 2 is a plan-view of the machine shown in the previous Figure.
Figure 3:
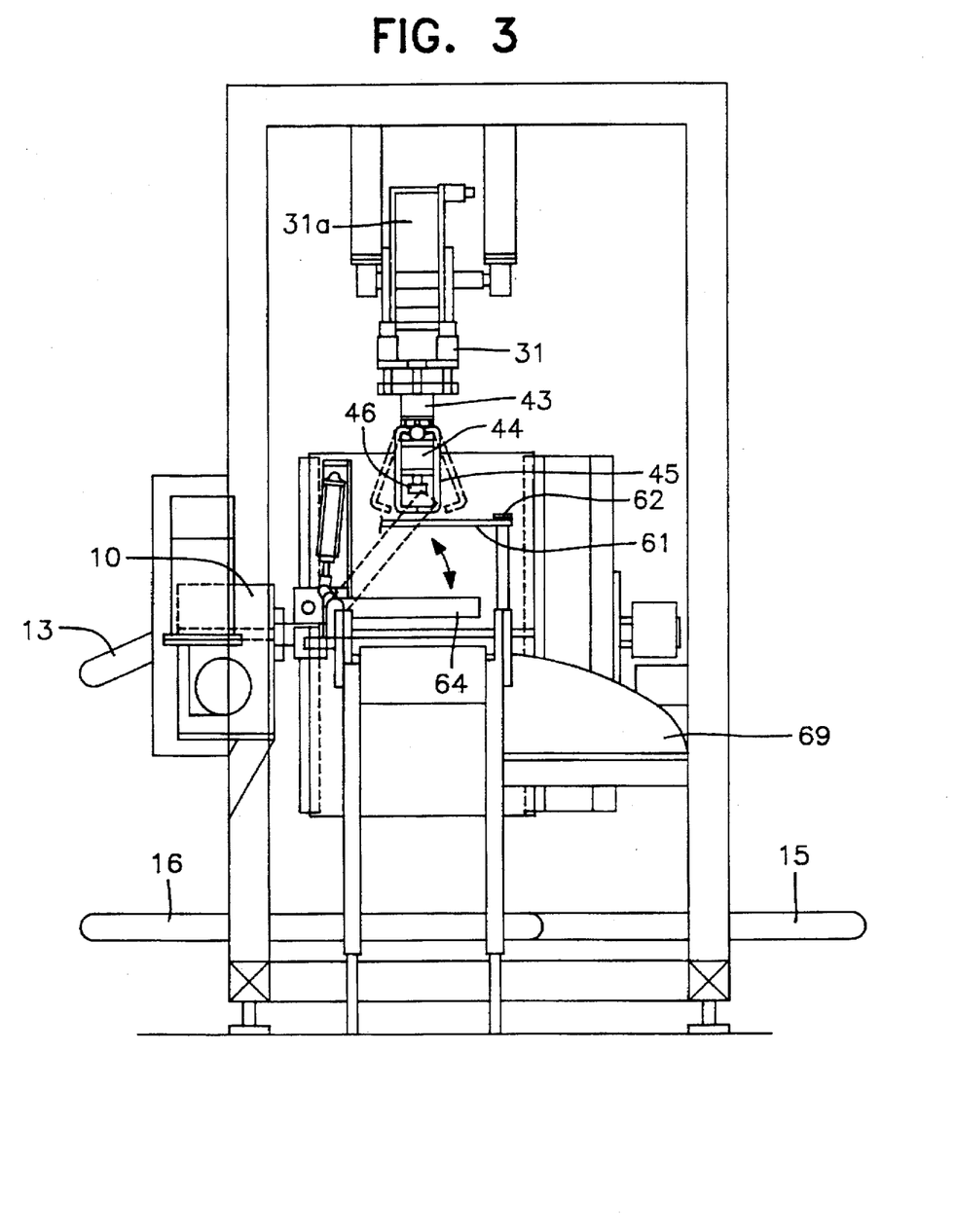
FIG. 3 is a front elevation of the machine showing its ingress area, i.e. the end of the mold feeding belt.

As illustrated in the FIGS. 1 to 3, the first station 11 is situated above the end of said mold feeding conveyor 6 consisting in a conveyor belt whose surface integrates cross members 7 provided to contribute to an efficient conveying of the molds 2 filled with the meat product 1, which are generally hand-loaded onto its surface by an operator.

According with what is shown in FIGS. 1 and 2, the machine includes means for feeding the molds 2 in such a way that they are properly centered both in the longitudinal and transversal directions, said means being associated in an area of the end of said conveyor belt 6 for feeding the molds 2 filled with the meat product 1. Thus at both sides of said conveyor belt 6 there are levers 58 which are resiliently urged in order to centrally converge on said run 6 and whose ends are associated through pins 60 to respective points of a cord 61 arranged in a closed circuit around respective freewheels 62 arranged at the end of respective vertical axles situated at the same distance of the central part of said conveyor belt and fixed to a supporting structure of said belt.

Besides, as can be seen in FIG. 3, near the end of said conveyor 6 below the first mold transferring station there are means for longitudinally centering the molds, said means comprising a tilting arm 64 which is arranged behind a mold 2 upon the arrival of the latter at said end and which is associated to a toothed rack device 65 which shifts said arm till contacting it with the mold body whose advance is limited by a transversal barrier 66 above aid conveyor 6. At both sides photoelectric detectors 67, 67a notice the presence of a mold 2.

Figure 4:
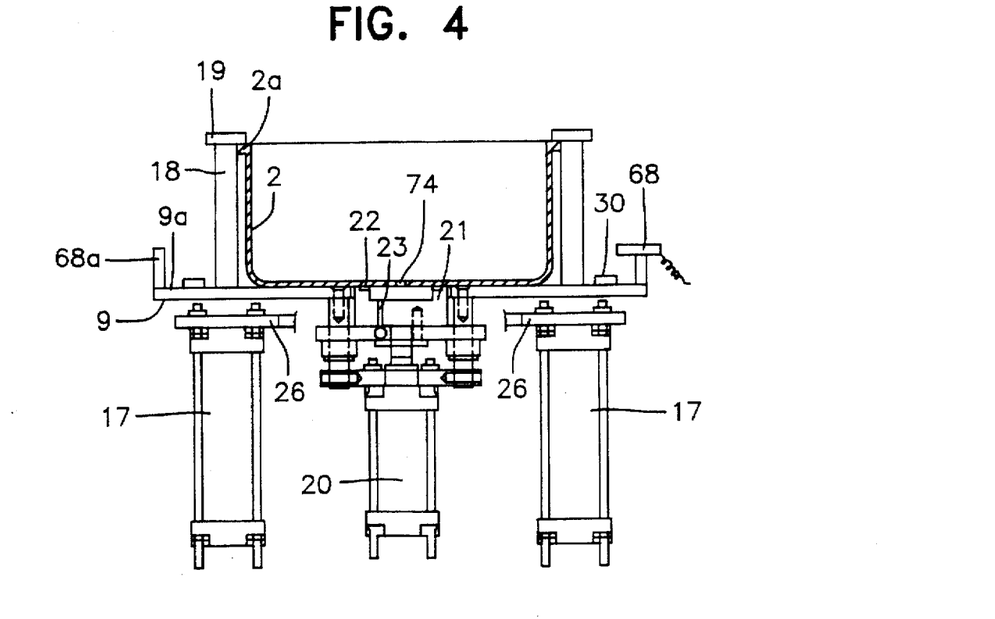
FIG. 4 shows in an elevational view the members provided to fasten the molds, said members being adaptable to the molds' characteristics of width and height, and being associated to each of the faces of said polygonal rotating body, blowing means to aid the removal of the meat block from the mold being also shown in this Figure.
Figure 5:
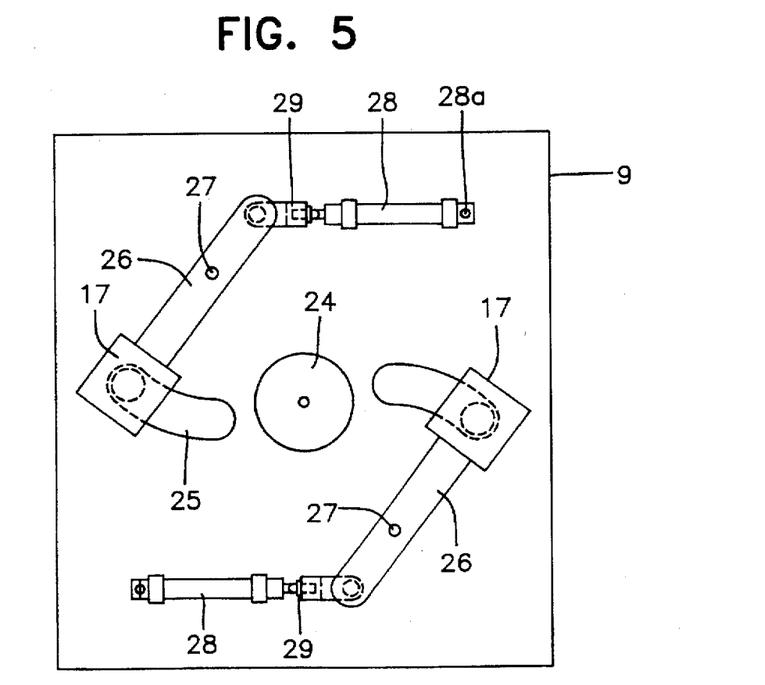
FIG. 5 is a plan-view from below one of the faces of the polygonal body allowing to appreciate the means for adjusting the fastening means shown in the previous Figure to the mold's width.

The means for temporarily fastening and holding the mold 9 while it rests on a respective one of the faces of the polygonal rotating body 9 comprises (see particularly FIGS. 4 and 5) fluid-operated cylinder 17 which are installed inside said polygonal body 9 and whose rods 18 project at right angles to said faces extending through arcuate openings 25 and ending in annular portions 19 provided to grab upon extension or retraction of said rods a rim 2a provided at the mold 2 opening, said fluid-operated cylinders 17 being associated to means provided to spread and to thereupon approach them so as to thus properly fasten the molds 2. In the FIG. 5 it has been indicated the means for mutually spreading and approaching said fluid-operated cylinders 17 comprising levers 26 which are mounted on the inner faces of said body, parallel to them, pivotable on an intermediary point 27 and which are linked at one of their ends to the rods 29 of fluid-operated cylinders 28 which are in their turn articulated at one of their ends 28a, said levers 26 being connected at their other end to the barrel of said fluid-operated cylinders 17 having the rods 18 for fastening and releasing the mold, said fluid-operated cylinders being properly guided and supported for their shifting and having their rods 18 extending through said arcuate openings 25, said cylinder barrels resting on the fringe area surrounding the edges of said arcuate openings by some supporting appendages 30.

As it can be evidenced in the FIG. 1, the said first station 11 for the transfer from the end of the belt feeding 6 of the molds 2 filled with meat product onto one of the faces 9a–9d of the polygonal rotating body 9 and the second station 12 for removing the lid 3 from the molds 2 integrate each one a gripper 31, 32 governed by an opening and closing actuator and provided to grip the crosspiece 4 associated to the lid 3 of the mold 2, both grippers 31, 32 being attached to the rod of a fluid-operated cylinder 31a, 32a having a rectilinear travel and allowing when being outstretched to reach the crosspiece 4 of the corresponding mold 2 respectively situated on the end of the feeding conveyor 6 or on the face 9a–9d of the rotating body 9.

The said grippers 31, 32 are tiltable, and for such a purpose they are suspended in a hinged connection from an intermediary area of the barrel of said cylinder 31a, 32a provided to approach the gripper to the lid of the molds, and the upper end of said barrel is linked to a transversally actuating, fluid-operated cylinder 31a, 32b in such a way that said grippers 31, 32 can be tilted 45 degrees till their central part where the gripper is located is situated at right angles to one of the faces 9a–9d of said polygonal body 9, said face having been as well turned and thus brought to a position where it faces said gripper.

Figure 6:
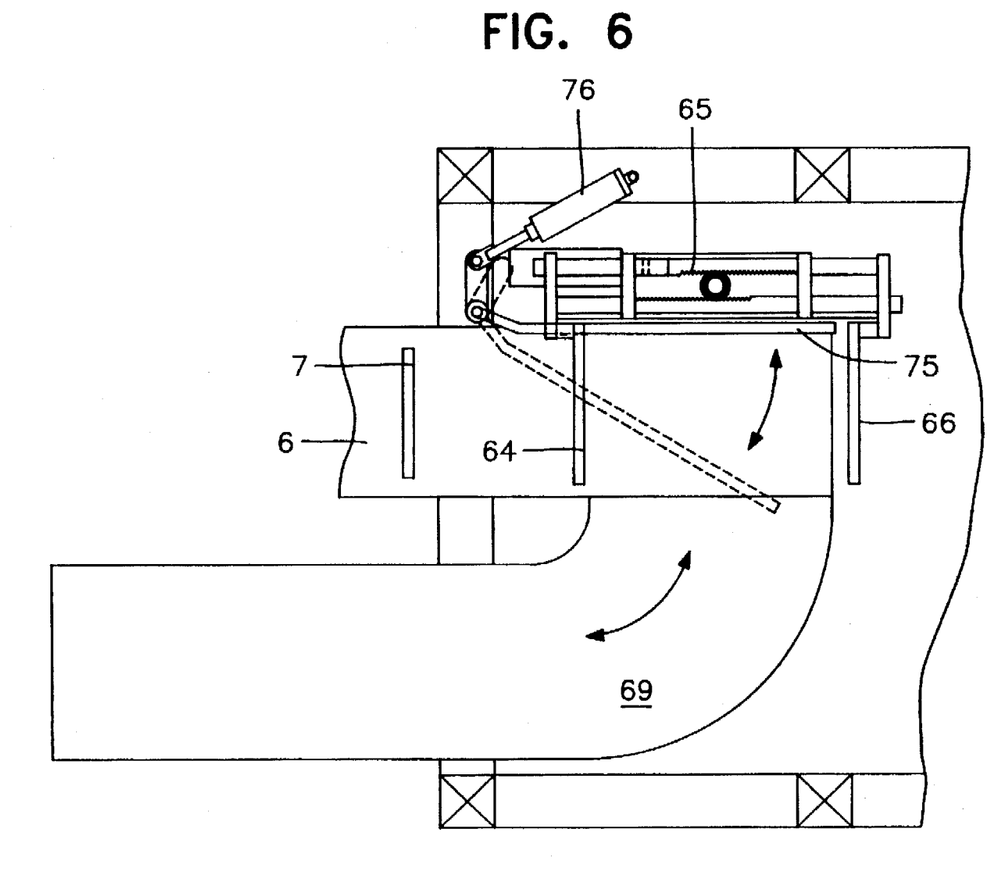
FIG. 6 is a plan-view of the area of arrival at the first station of the product filled mold feeding conveyor detailing a discharge chute for undetected molds.
Figure 8A:
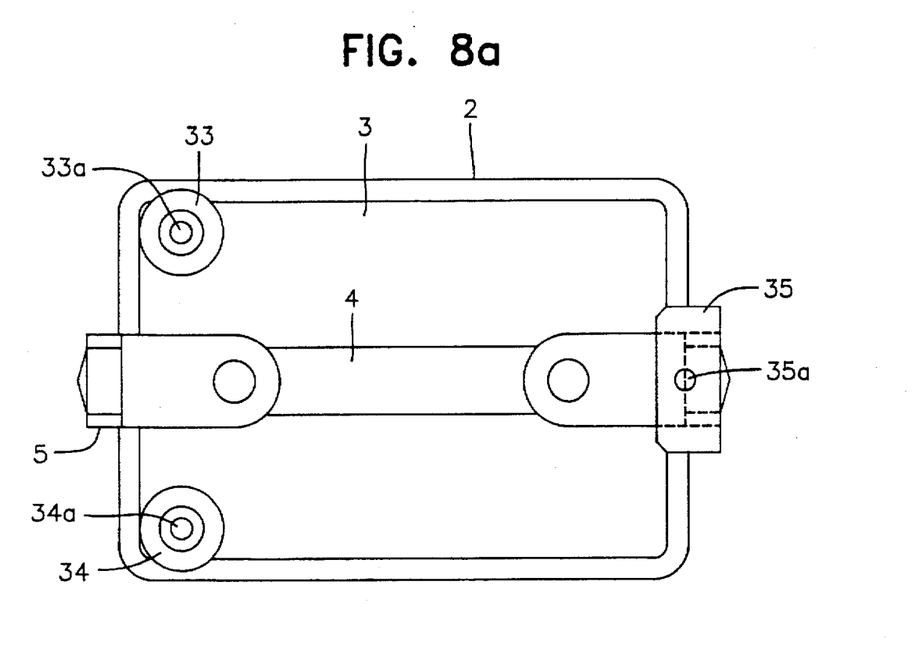
FIGS. 8a and 8b are both plan-views showing the arrangement of the feelers for the detection of a mold with two toothed locking arms and with three arms, respectively.
Figure 8B:
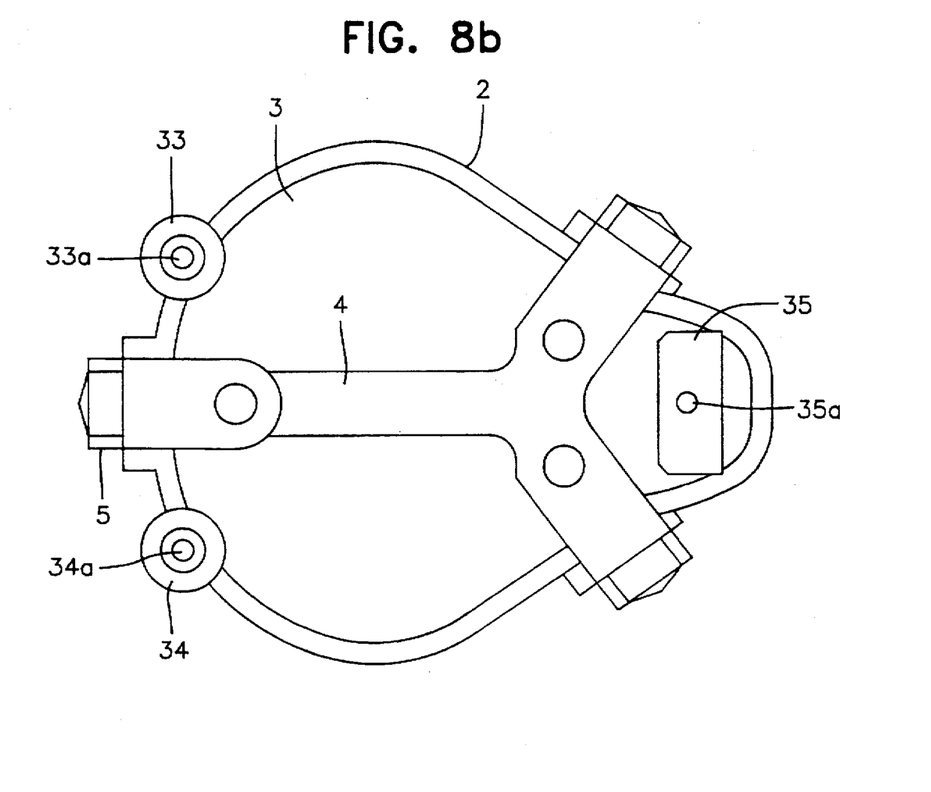
Figure 9:
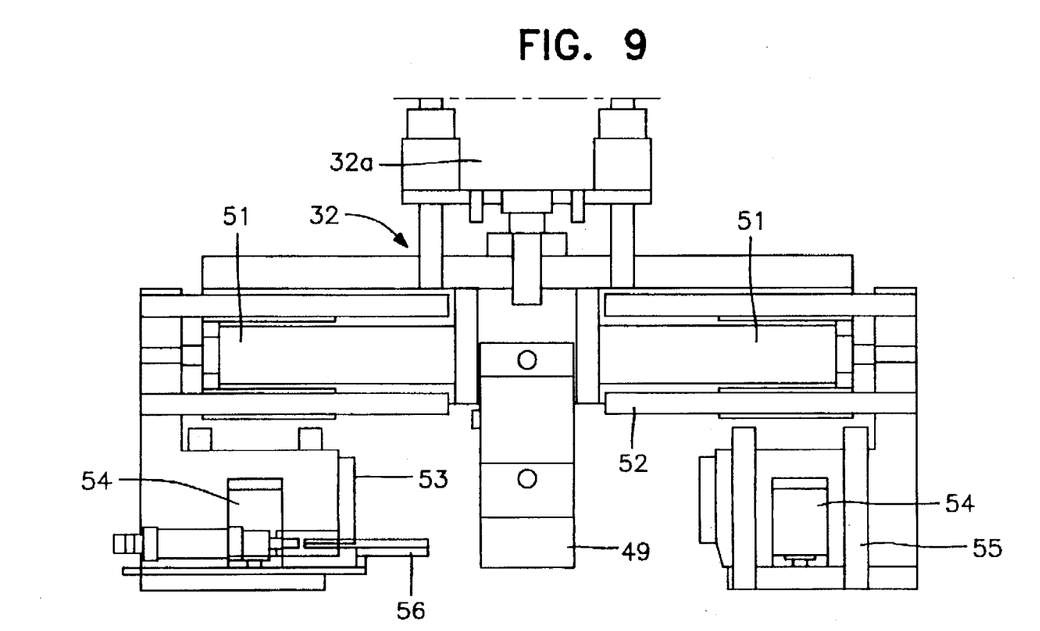
FIG. 9 is a side elevation of the gripper associated to the second station for the removal of the lid, and FIGS. 9a and 9b (the second one schematic) illustrate a detail of the means for withdrawing the locking arms, said operation having been as well represented in FIG. 2.
Figure 9A:
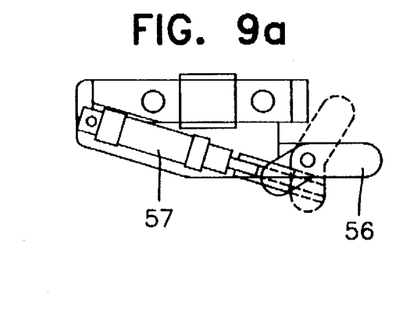
Figure 9B:
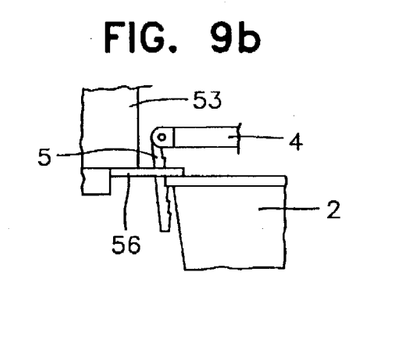

The mentioned gripper 31 of the first mold transferring station 11 integrates feelers 33, 34, 35 associated to resiliently loaded rods 33a, 34a, 35a mounted in a sliding arrangement as per a direction parallel to that of actuation of the approaching cylinder 31a, the ends of said rods 33a, 34a, 35a being in the vicinity of proximity detectors (not illustrated) integral with a gripper 31 frame for the detection of the number of arms 5 of the molds 2, said detectors supplying as information for a proper positioning of the second lid 3 removing gripper 32 so as to release said lid 3 from the locking arms 5. In the FIGS. 8a and 8b it can be seen the relative positioning os said feelers 33, 34, 35 relative to two different molds. Furthermore it has been foreseen next to the end of said conveyor 6 and below the first transfer station 11 (as illustrated in FIG. 6) a lateral chute 69 for the discharge of those molds that could not be properly detected (inaccurately positioning, sole weight, etc.) under the action of an arm 75 driven by a cylinder 76.

Figure 7:
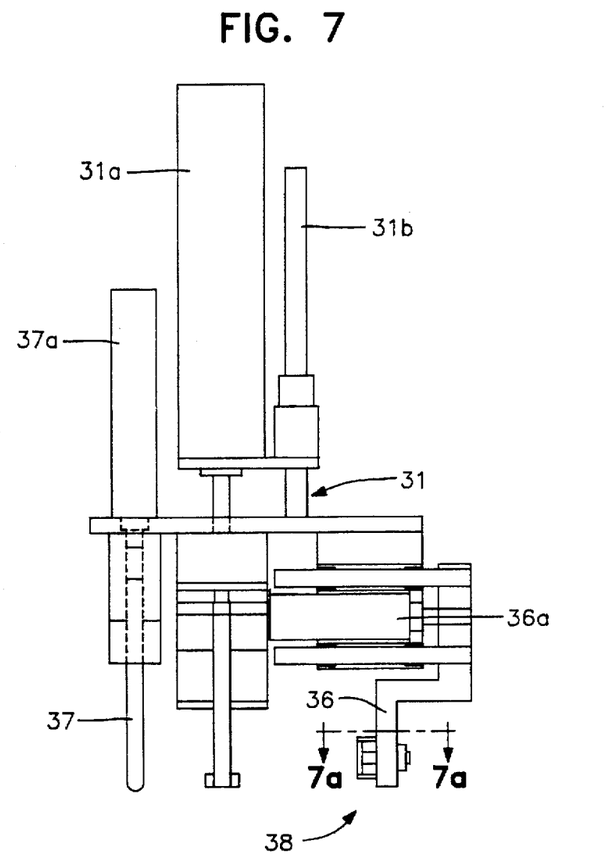
FIG. 7 is a side elevation of the gripper of the first station for loading the molds from the end of the feeding conveyor onto one of the faces of the polygonal rotating body.
Figure 7A:
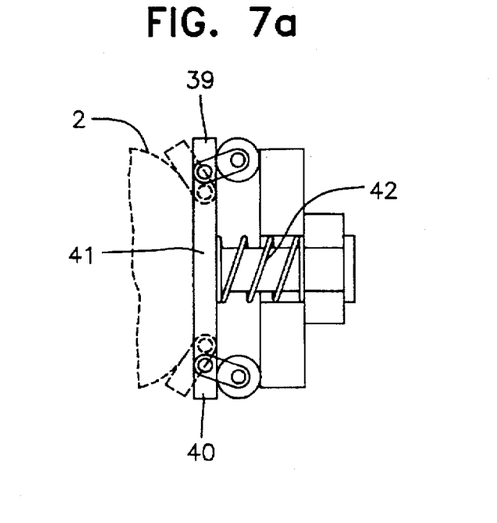
FIG. 7a shows a detail of a mold self centering device associated to said first station gripper.

The gripper 31 of said first station integrates besides (see FIGS. 7 and 7a) members 36, 37 provided to act as stops for the positioning of the body and the crosspiece 4 of the molds 2 and associated to corresponding fluid-operated cylinders 36a, 37a, one of these members 36 actuating in a transversal direction, perpendicularly to the lateral side of the mold 2 and comprising a device provided to aid the centering of said mold 2 and consisting of two tiltable strips 39, 40 linked to the ends of a spring 42 loaded central plate 41 provided to contact a curved side of the mold 2.

As it can be appreciated in FIG. 3, the gripper 31 of said first station 11 integrates besides two complementary fluid-operated cylinders 43, 44 which are superimposed and whose rods are coaxial and are arranged in the extension of the axis of the approaching cylinder 31a rod, the first 43 of these cylinders being provided to close the gripper's fingers 45, whereas the second 44 of these cylinders has its rod ending in a stop 46 interposed between said gripper's fingers 45 and provided to fasten the mold's crosspiece 4 once the latter has been gripped by said gripper's fingers 45.

Figure 10:
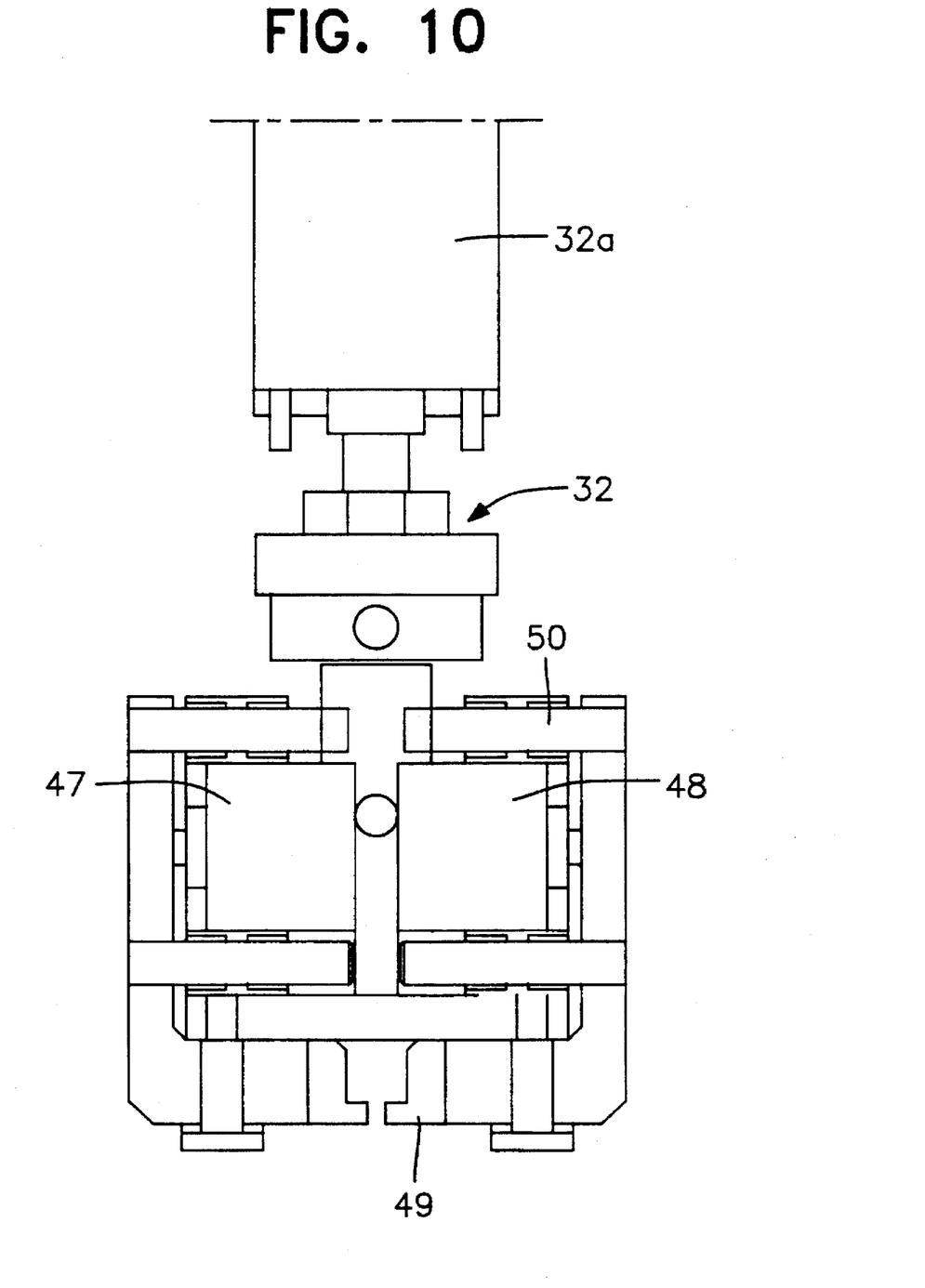
FIG. 10 is an elevational view of the central part of the gripper of this second lid removing and discharging station, said central part being provided for controlling the gripper's fingers for gripping the crosspiece.

Concerning the gripper 32 of the second station 12 for the removal and discharge of the molds' lids comprises a central portion (see FIG. 10) where it integrates first fluid-operated cylinders 47, 48 to actuate fingers 49 of the gripper provided to grip the mold's crosspiece 4, and various members 53 surrounding said central portion and provided to approach it by means of the actuation of second fluid-operated cylinders 51 which in their turn integrate third fluid-operated cylinders 54 which actuate perpendicularly to said second cylinders 51, for a higher or lower positioning of hinged levers 56 linked to the ends of fourth fluid-operated cylinders 57, said levers 56 being arranged below the mold's crosspiece 4 and next to the hinged arms 5 in order to release them.

The means for removing the product block 1 from inside the mold 2 in said third station 14 comprises suction pads 70 connected to a vacuum pump 71 and linked to the free end of a pivoting lever 72 articulated at its other end and linked at an intermediary point to a fluid-operated cylinder 73 provided to turn said lever to thus bring it to a position where its suction pad meets the meat block molded inside the mold 2, and a pressurized air supply nozzle 23 installed inside a cup 21 surrounded by a seal 22, said cup being connected to the end of a fluid-operated cylinder 20 installed inside said polygonal body 9 at right angles to the plane on which the mold 2 rests and extending through a hole 24 of said plane, in order to apply itself against the bottom of the mold, said bottom being provided with at least one hole 74.

Figure 11:
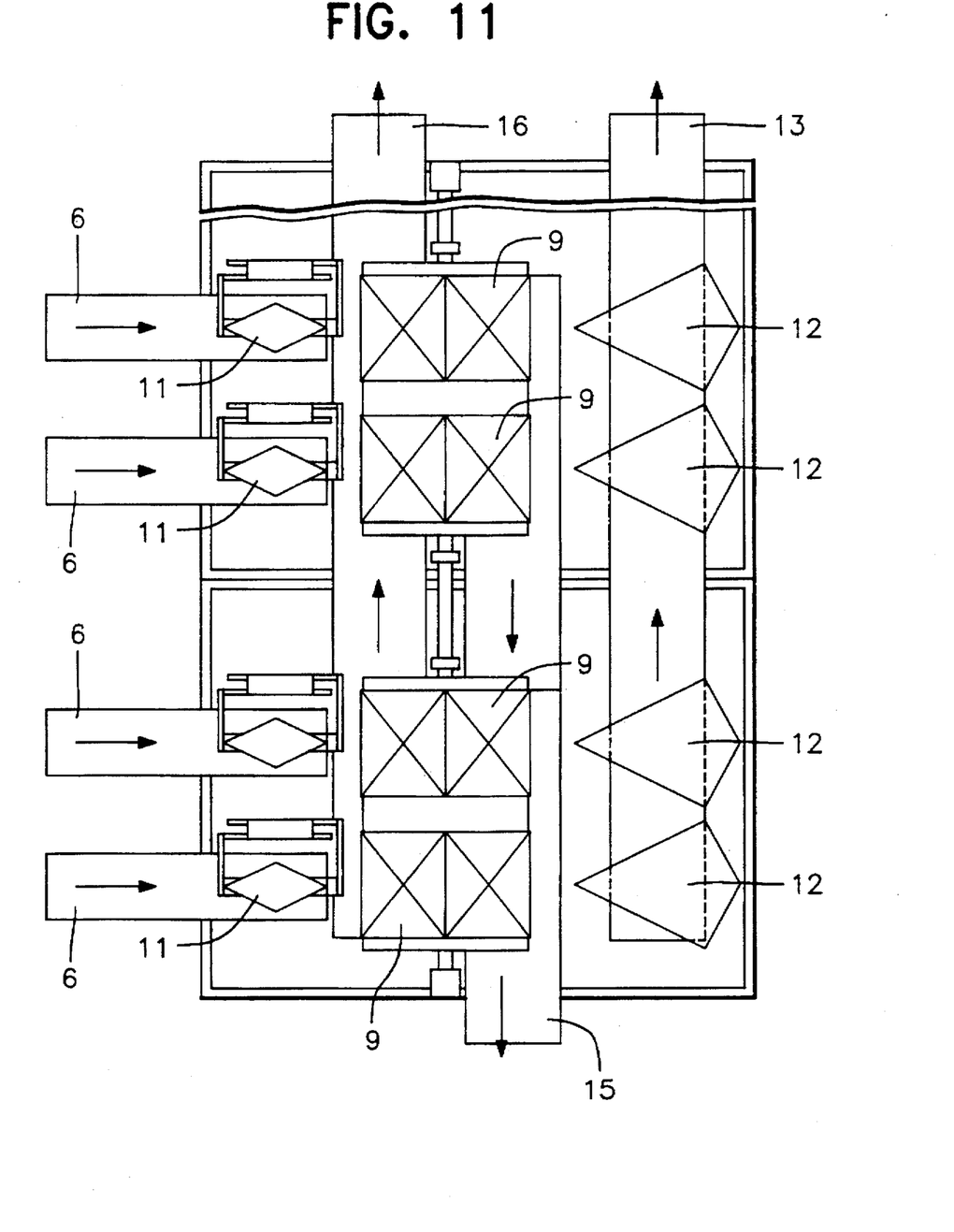
FIG. 11 is a schematic plan-view showing the association of two machines like the proposed one sharing the conveyor belts for the discharge of the lids, the stripped product and the molds.

FIG. 11 illustrates the modular possibility of said machine, allowing to join several assemblies working together in a very simple and rational way.

Figure 12:
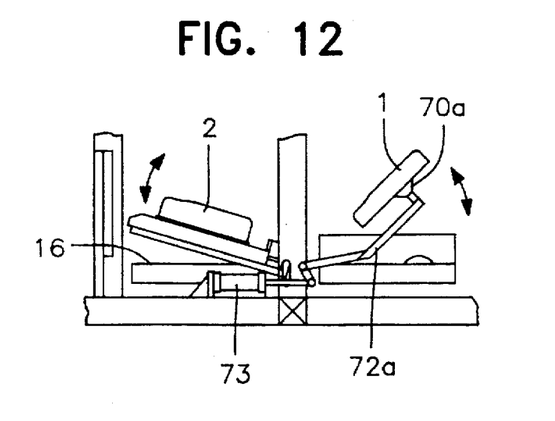
FIGS. 12 to 14 show an alternative embodiment of some means conceived to transfer the empty mold towards a conveyor belt for removal of said molds and a different positioning of the means illustrated in FIG. 1 to aid to remove the meat product from the mold.
Figure 13:
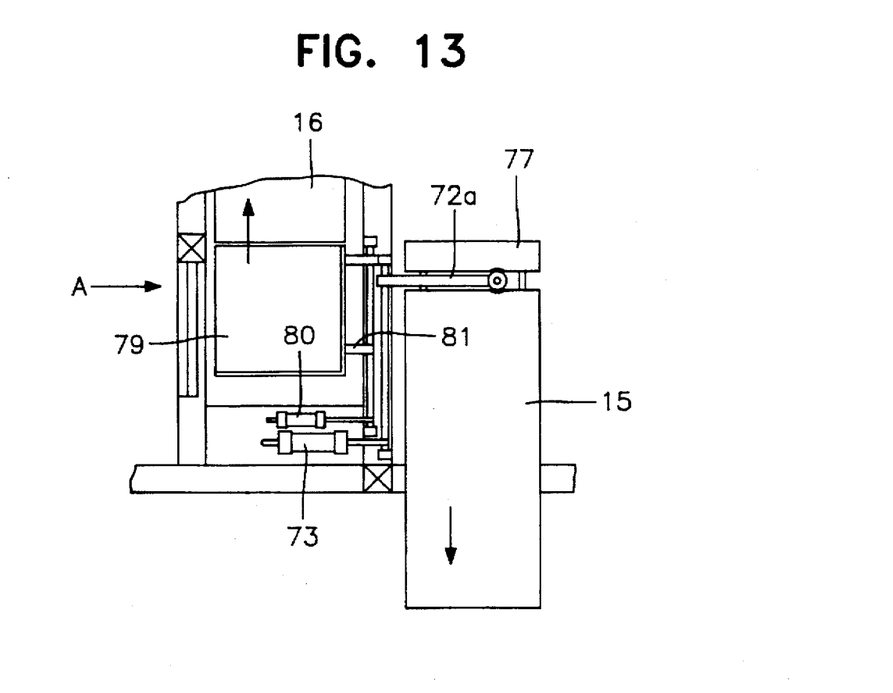
Figure 14:
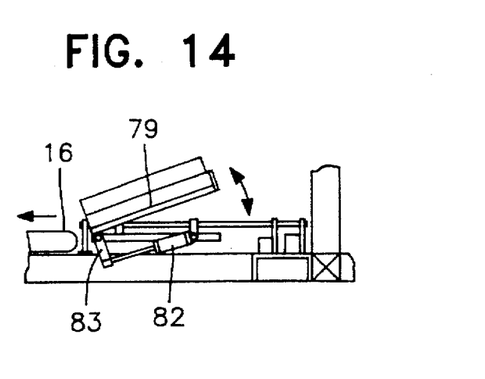

FIGS. 12 to 14 show a different positioning and as well as little alteration of mentioned pivoting lever, here indicated by 72a articulated by one of its end to a fluid-operated cylinder 73a provided to turn said lever 72a to thus bring it to a position where its suction pad 70a meets a meat block molded inside one mold. An inclined plane 71 placed close to the arcuate run of said lever 72a, assist in a correct discharge of the meat block 1 onto referred conveyor belt 15.

Also illustrated in said FIGS. 12 to 14 it can be seen a platform 79 located close the conveyor belt 16 for the discharge and removal of the empty molds and provided of a first tiltable means (cylinder 80 and lever 81) for approaching said platform 79 to the outer face 9c of the polygonal body 9 and also outfitted with second tiltable means (cylinder 82 and lever 83) for transferring an empty mold 2 from said platform 79 onto said exit conveyor belt 16.

I claim:

1. An automatic stripping machine for meat products, with integrated filled mold feeding, such as hams or other meat products previously baked in a mold and compressed by a lid inserted in said mold and provided with at least one crosspiece mounted in a floating arrangement on two or more columns integral with said lid, with interposition of resilient means, and lid locking arms resiliently hinged on different points of said crosspiece, having a toothed profile for locking said lid to said mold, and having one of their teeth locked under an external rim which surrounds a mold opening, said machine successively carrying out the operations of: sequential feeding of the molds filled with said meat product and closed with said lid; identifying the number of said lid locking arms for the purpose of subsequently removing said lid; removing said lid from said mold and discharging said lid; stripping said meat product from said mold; and separately discharging said product and said molds once emptied, said machine comprising:

a conveyor for feeding said molds filled with said meat product;

at least a polygonal body rotating around a horizontal central axis;

said central axis being arranged transversally to a feeding direction of said conveyor;

outer faces in said polygonal body;

said outer faces of said body integrating means to temporarily fasten a mold with its base resting on one of said outer faces; and said polygonal body being rotationally actuated by an intermittent drive unit provided to position each of said outer faces of said polygonal body in successive steps covering rotational increments of uniform amplitude:

in proximity of a first station for transferring said molds filled with said meat product onto said outer face;

facing a second station for the removal and discharge of said lid of said mold through a path;

in proximity of a third station having means to aid to remove said product from said mold above a conveyor belt for the discharge of stripped products; and finally above a conveyor belt for the discharge and removal of said molds once emptied, respectively.

2. A machine as per claim 1, wherein:

said polygonal body is a straight prismatic, quadrangular one and is rotatably supported on two of its opposed sides and connected on one of them to an intermittent rotational drive unit; and said polygonal body housing inside means for temporarily fastening said molds, as well as blowing means to aid in stripping said meat product.

3. A machine as per claim 1, wherein:

said first station is situated above an end of said conveyor for feeding said molds filled with said meat product; and said conveyor consisting in a conveyor belt whose surface integrates cross members provided to contribute to an efficient conveying of said molds filled with said meat product, which are generally hand-loaded onto its surface by an operator.

4. A machine as per claim 3, wherein:

means are provided for feeding said molds in such a way that they are properly centered both in the longitudinal and transversal directions; and said means being located in an area close to an end of said conveyor belt for feeding said molds filled with said meat product.

5. A machine as per claim 2, wherein:

said means for temporarily fastening and holding said mold while it rests on a respective one of said outer faces of said polygonal rotation body comprise first fluid-operated cylinders which are installed inside said polygonal body and whose rods project at right angles to said outer faces thereof extending through arcuate openings;

edges at said arcuate openings;

said rods ending in annular portions provided to grab a rim provided at said mold opening upon extension or retraction of said rods; and said first fluid-operated cylinders being associated to means provided to spread and to thereupon approach them so as to thus properly fasten said molds.

6. A machine as per claim 5, wherein:

said means for mutually spreading and approaching said first fluid-operated cylinders installed inside said polygonal rotating body comprise levers which are mounted on inner faces of said polygonal body: said lever are parallel to said rotating body, pivotable on an intermediary point and are linked at one of their ends to rods of second fluid-operated cylinders which are in their turn articulated at one of their ends;

said levers being connected at another end to a barrel of said first fluid-operated cylinders;

said first fluid-operated cylinders being properly guided and supported for their shifting and having their rods extending through said arcuate openings; and said barrels of said first fluid-operated cylinders resting on a fringe area surrounding said edges of said arcuate openings by some supporting appendages.

7. A machine as per claim 1, wherein:

said first station and said second station integrate each one a gripper governed by an opening and closing actuator and provided to grip said crosspiece associated to said lid of said mold; and said gripper being attached to a rod of a fluid-operated cylinder having a rectilinear travel and allowing when being outstretched to reach said crosspiece of said corresponding mold respectively situated on said end of said conveyor or on said face of said rotating body.

8. A machine as per claim 7, wherein:

said grippers are tiltable suspended in a hinged connection from an intermediary area of a barrel of said cylinder provided to approach said gripper to said lid of said molds; and said upper end of said barrel is linked to a transversally actuating, fluid-operated cylinder in such a way that said grippers can be tilted 45 degrees till their central part where said gripper is located is situated at right angles to one of said faces of said polygonal body said face having been as well turned and thus brought to a position where it faces said gripper.

9. A machine as per claim 7, wherein:

said gripper of said first station integrates three feelers associated to resiliently loaded rods mounted in a sliding arrangement as per a direction parallel to that of actuation of said approaching cylinder; and said ends of said rods being close to proximity detectors integral with a gripper frame for detection of number of locking arms of said molds, said detectors supplying an information for a proper positioning of said second lid removing gripper so as to release said lid from said locking arms.

10. A machine as per claim 9, wherein:

said gripper of said first station further comprising members associated to corresponding fluid-operated cylinders provided to act as stops for a positioning of said mold and said crosspiece of said mold; and one of said members actuating in a transversal direction, perpendicularly to said lateral side of said mold and comprising a device provided to aid in said centering of said mold and consisting of two tiltable strips linked to the ends of a spring loaded central plate provided to contact a curved side of said mold.

11. A machine as per claim 9, wherein:

said gripper of said first station integrates two complementary fluid-operated cylinders which are superimposed and whose rods are coaxial and are arranged in an extension of said axis of said approaching cylinder rod;

a first of said complementary fluid-operated cylinders being provided to close said gripper's fingers;

a second of said complementary fluid-operated cylinders has its rod ending in and interposed between said gripper's fingers and provided to fasten said mold's crosspiece once said latter has been gripped by said gripper's fingers.

12. A machine as per claim 7, wherein said gripper of said second station for removal and discharge of said molds' lids comprises:

a central portion where it integrates first fluid-operated cylinders to actuate fingers of said gripper provided to grip said mold's crosspiece, and various members surrounding said central portion and provided to approach it by means of actuation of another fluid-operated cylinders which in their turn integrate third fluid-operated cylinders which actuate perpendicularly to said another cylinders, for a higher or lower positioning of hinged levers linked to the ends of fourth fluid-operated cylinders; and said levers being arranged below said mold's crosspiece and next to said hinged arms in order to release them.

13. A machine as per claim 4, wherein:

at both sides of said conveyor belt there are levers which are resiliently urged in order to centrally converge on a run of said mold; and both ends of said levers are associated through pins to respective points of a transversal cord arranged in a closed circuit around respective freewheels arranged at one end of respective vertical axles situated at said same distance of said central part of said conveyor belt and fixed to a supporting structure of said belt.

14. A machine as per claim 1, wherein:

said end of said conveyor below said first station integrates means for longitudinally centering said molds;

said means for centering said molds comprising a tilting arm which is arranged behind a mold upon said arrival of the latter at said end;

said tilting arm being associated to a toothed rack device which shifts said arm till contacting it with said mold whose advance is limited by a transversal barrier above said conveyor.

15. A machine as per claim 14, wherein it integrates next to said end of said conveyor and below said first station a lateral chute for discharging of those molds that could not be properly detected under said action of an arm driven by a cylinder.

16. A machine as per claim 1, wherein:

said means for removing said meat product from inside said mold in said third station comprise suction pads connected to a vacuum pump;

said suction pads being linked to a free end of a pivoting lever articulated at its other end and linked at an intermediary point to a first fluid-operated cylinder provided to turn said lever to thus bring it to a position where its suction pad meets said meat product inside said mold; and a pressurized air supply nozzle installed inside a cup surrounded by a seal being connected to an end of a second fluid-operated cylinder installed inside said polygonal body at right angles to said plane on which said mold rests and extending through a hole of said plane, in order to apply itself against said bottom of said mold, said bottom being provided with at least one hole.

17. A machine as per claim 1, and further comprising:

a platform close to said conveyor belt for the discharge and removal of said empty molds;

first tiltable means for approaching said platform to said outer face of said polygonal body;

second tiltable means for transferring a mold once emptied from said platform onto said conveyor belt.

* * * * *